United States Patent
Smith et al.

(10) Patent No.: US 7,040,750 B2
(45) Date of Patent: May 9, 2006

(54) ROTATABLE AND REMOVABLE AUXILIARY EYEWEAR SYSTEM WITH SNAP ALIGNMENT

(75) Inventors: Greg Smith, Plano, TX (US); Philip Langley, Plano, TX (US)

(73) Assignee: E'lite Optik U.S. L.P., Carrollton, TX (US)

( * ) Notice: Subject to any disclaimer, the term of this patent is extended or adjusted under 35 U.S.C. 154(b) by 0 days.

(21) Appl. No.: 10/910,846

(22) Filed: Aug. 4, 2004

(65) Prior Publication Data

US 2005/0088612 A1    Apr. 28, 2005

Related U.S. Application Data

(60) Provisional application No. 60/514,323, filed on Oct. 24, 2003.

(51) Int. Cl.
*G02C 9/00* (2006.01)
(52) U.S. Cl. ............................ 351/47; 351/57
(58) Field of Classification Search ................. 351/47, 351/48, 57, 58, 44, 41
See application file for complete search history.

(56) References Cited

U.S. PATENT DOCUMENTS 6,827,437 B1 *  12/2004  Kim ............................. 351/47

* cited by examiner

*Primary Examiner*—Hung Xuan Dang
(74) *Attorney, Agent, or Firm*—Storm LLP; John J. Fischer; John J. Patti

(57) ABSTRACT

The present invention discloses a unique and novel system for attaching an auxiliary lens assembly to a primary lens assembly in which the attachment includes two alternative positions, a lowered position and a raised position. In the lower position, the person wearing the eyewear system views through both the primary lenses and auxiliary lenses. In the raised position, the person wearing the eyewear system views only through the primary lenses. As a further option, the auxiliary lens assembly is easily removable from the primary lens assembly, allowing for separate storage of the auxiliary lens assembly when not needed. Slotted extensions on the primary lens frame receive retainers attached to auxiliary extensions on the auxiliary lens assembly. Each auxiliary extension has a rocker pivotally attached to a keyseat. An internal spring urges the rocker into snap alignment with the surfaces of the keyseat.

8 Claims, 13 Drawing Sheets

ROTATABLE AND REMOVABLE AUXILIARY EYEWEAR SYSTEM WITH SNAP ALIGNMENT

RELATED ART

This patent claims priority to U.S. Provisional Application 60/514,323, filed Oct. 24, 2003.

TECHNICAL FIELD OF INVENTION

The present invention relates to eyewear, and in particular, to a design for and auxiliary lens assembly and primary lens assembly combination in which the auxiliary lens assembly is adapted for rotatable and removable attachment to the primary lens assembly. More specifically, the present invention discloses to an auxiliary eyewear support system that utilizes pivotal hinges integral to the auxiliary frame, which permit rotation of the auxiliary frame from a first position in which the auxiliary lenses are substantially parallel to the primary lenses, to a second position in which the auxiliary frame is rotated into a position substantially perpendicular to the orientation of the primary frame.

BACKGROUND OF THE INVENTION

It has long been desirable to have a removable auxiliary lenses attached to eyeglasses. Professional baseball players have used "flip-up" auxiliary lenses for more than four decades to protect their eyes from the sun, but to allow them unrestricted vision in the event the ball was hit in their vicinity.

U.S. Pat. No. 3,252,747 to Robins discloses an eyewear system specifically designed for persons who are farsighted. The device includes an assembly in which an auxiliary frame assembly containing lenses may be rotated about the horizontal axis and remain attached to a primary assembly so as to locate the lenses the proper distance to the eyes every time the device is lowered into place. A significant disadvantage of this design is that it is unattractive, overly complicated, impossible to segregate from the primary frame, and does not permit or accommodate anyone other than far sighted individuals.

U.S. Pat. No. 6,089,708 to Ku discloses a connecting member having spaced connecting plates for attachment to the bridge portion of a primary lens assembly. The connecting plates have magnetic members that act cooperatively with a complimentary magnetic member inserted in a hole on the bridge. The front of the connecting part has an open communication to a polygonal-shaped holding room. The auxiliary frame has connecting rods extending above the bridge portion, and supporting an intermediate portion having a polygonal shape, receivable and rotatable in the holding room. A significant disadvantage of this design is that it is unattractive, overly complicated, and resist easy and immediate removal of the auxiliary lens assembly.

U.S. Pat. No. 3,238,005 to Petitto discloses the combination of a primary lens assembly and auxiliary lens assembly. The auxiliary assembly has flexible side wall projections with openings that can be assembled onto lugs (pins) extending perpendicularly from the sides of the primary assembly, allowing the auxiliary assembly to be pivoted upwards, and back downwards. Leaf springs mounted on the auxiliary assembly engage surfaces of the primary assembly to urge the auxiliary assembly into position. A significant disadvantage of this design is that it is unattractive, overly complicated, and resist easy and immediate removal of the auxiliary lens assembly.

As stated, these and other mechanically "clipped-on" devices for holding auxiliary lenses are cumbersome and unattractive. More recently, numerous attempts have been made to magnetically attach an auxiliary lens assembly to a primary lens assembly.

U.S. Pat. No 4,070,103 to Meeker discloses a primary lens assembly having a slidably attachable auxiliary lens assembly. In this device, the primary lens assembly is made of magnetizable material and auxiliary lenses are individually securable to the primary lens assembly by a magnetic band inserted in a groove on the inside surface of the individual auxiliary lens assembly. This design is not pivotal, and the auxiliary assembly must be physically removed.

U.S. Pat. No. 5,416,537 to Sadler discloses a primary lens assembly having a first magnetic member attached vertically to the front surface of the primary lens assembly, and a second magnetic member attached in a corresponding position on the back surface on an auxiliary lens assembly. The magnetic members are arranged for engagement to secure the auxiliary lens assembly to the primary lens assembly. This design is not pivotal, and the auxiliary assembly must be physically removed.

U.S. Pat. No. 5,568,207 to Chao also discloses a magnetically adhered auxiliary lens assembly, with the additional feature of arms extending from the side portions of the auxiliary lens assembly, over magnet retaining projections and extensions of the primary lens assembly. The arms engage with, and are supported on, the primary lens assembly extensions to prevent disengagement of the auxiliary lens assembly upon downward movement of the auxiliary lens assembly relative to the primary lens assembly. This design is not pivotal, and the auxiliary assembly must be physically removed.

Auxiliary eyewear systems such as those described above require the auxiliary frame assembly be removed from the primary frame assembly, and then handled and stored separately when it is necessary for the eyeglass wearer to look only through the lenses of the primary frame assembly. They do not enjoy the advantages of the early flip-up designs, which permitted quick movement of the auxiliary assembly out of alignment with the primary assembly without separating them from the primary assembly.

U.S. Pat. No. 6,474,811 to Liu discloses a magnetically attached auxiliary lens assembly in which the auxiliary assembly can be magnetically attached to the either the inside or outside of extensions having magnets on the primary assembly. The auxiliary assembly is pivotal upwards, removing the pivotal alignment of the auxiliary and primary lenses. A significant disadvantage of this design is that it is unstable, relying on tenuous repositioning, and magnetic forces alone to align and support the auxiliary assembly to the primary assembly. Another significant disadvantage of this design is that causes the auxiliary frame to be positioned into the forehead of the wearer, making raising the auxiliary assembly fully perpendicular to the primary assembly impractical.

U.S. Pat. No. 6,301,953 to Xiao discloses an auxiliary lens assembly having pivots mounted above the lenses and attached by long, L-shaped shelter arms. The shelter arms are attached to supporting arms having magnet holding housings attached at their ends. Magnets are inset in the housings for engagement over rearwardly protruding rim lockers. One disadvantage of this design is that it is fails to limit the rotation of the auxiliary lens assembly. Another disadvantage is that it is esthetically unappealing, due in part to the long shelter arm requirement. Another disadvantage is that it relies on a bridge magnet or bridge hook for stability.

Another disadvantage is that the device relies on magnetic force to pull the magnetic housing forward, over a rearward protruding lens locker, requiring the user push the auxiliary frame awkwardly rearward, into the primary frame, to disengage the magnetic housing from over the lens locker. Another disadvantage is that the device is complex and expensive to manufacture.

It can thus be seen that there is a need to develop a design for an auxiliary frame assembly and primary frame assembly combination in which the auxiliary frame assembly can be flipped into a position in which the contribution of the auxiliary lenses is temporarily removed, without detaching the auxiliary lens assembly from the primary frame assembly, which is capable of accurately aligning the auxiliary and primary assemblies and stably supporting them.

SUMMARY OF THE INVENTION

A primary advantage of the present invention is that it provides accurate, snap alignment of the auxiliary lens assembly to the primary lens assembly when raised and when lowered back into position. Another advantage of the present invention is that it provides an auxiliary lens assembly and primary lens assembly combination in which the auxiliary lens assembly is easily installed and removed from the primary lens assembly. Another advantage of the present invention is that it provides a means of temporary displacement of the auxiliary lenses without a need for complete removal and separate storage of the auxiliary lens assembly. Another advantage of the present invention is that it provides an auxiliary lens assembly and primary lens assembly combination which resists unintended disengagement. Another advantage of the present invention is that it is simple and aesthetically attractive. Another advantage of the present invention is that it provides the fully perpendicular alignment of the auxiliary assembly to the primary assembly without contacting the forehead of the person wearing the device. Another advantage of the present invention is that it provides a primary lens assembly optionally compatible with non-rotatable auxiliary lens assemblies. Another advantage of the present invention is that it provides optional embodiments that can be constructed without magnets.

Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

In accordance with one aspect of the invention, there is provided a primary lens assembly retaining a pair of primary lenses. An auxiliary lens assembly retains a pair of auxiliary lenses. The auxiliary lens assembly may be attached to the primary lens assembly. In this manner, the person wearing the eyewear system has two lenses combining to alter the transmission of light to each eye.

In the preferred embodiment, the primary lens assembly has a primary frame for retaining a pair of primary lenses. A pair of slotted extensions are attached to the primary frame. A primary magnet is located in each slotted extension. An auxiliary lens assembly is provided having an auxiliary frame for retaining a pair of auxiliary lenses. A pair auxiliary extensions are attached to the auxiliary frame. A pair of brackets are attached to the auxiliary frame. A rocker is pivotally attached to each bracket. An arm extends from the other side of the rocker. A retainer is attached to each arm. The retainers are locatable within the slotted extensions of the primary frame. An auxiliary magnet is located in each retainer.

In a second embodiment, the retainers are solid, have no magnets, and are made of magnetic material. In a third embodiment, rear extension portions are solid, have no magnets, and are made of magnetic material. In a fourth embodiment, the retainers are directly connected to the ends of the brackets. In this embodiment, the auxiliary lens assembly is not rotatable relative to the primary lens assembly.

In a fifth embodiment, no magnets are required in either the primary lens assembly or the auxiliary lens assembly, and the retainers and slotted extensions need not be made of magnetic material. Compressible bushings are located in the retainers in substitution for the magnets. In a sixth preferred embodiment, no magnets are required in either the primary lens assembly or the auxiliary lens assembly, and the retainers and slotted extensions need not be made of magnetic material. The retainers are directly connected to the ends of the brackets. Compressible bushings are located in the retainers.

In the preferred embodiment, the primary lenses may be corrective lenses and the auxiliary lenses may be light transmission reducing lenses, for example, a polarizing, absorbing, refracting, photochromatic, or reflecting lenses, or any combination thereof (i.e., sunglasses). In a seventh embodiment, the primary lenses are corrective lenses and the auxiliary lenses are impact resistant and/or radiation resistant (i.e., welding lenses) safety lenses.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as used herein are referenced from the perspective of a person wearing the primary and auxiliary lens assemblies. The references are intended to aide in the description of the device, and are not intended to be limiting, since the preferred embodiments of the device are generally symmetric.

Figure 1:
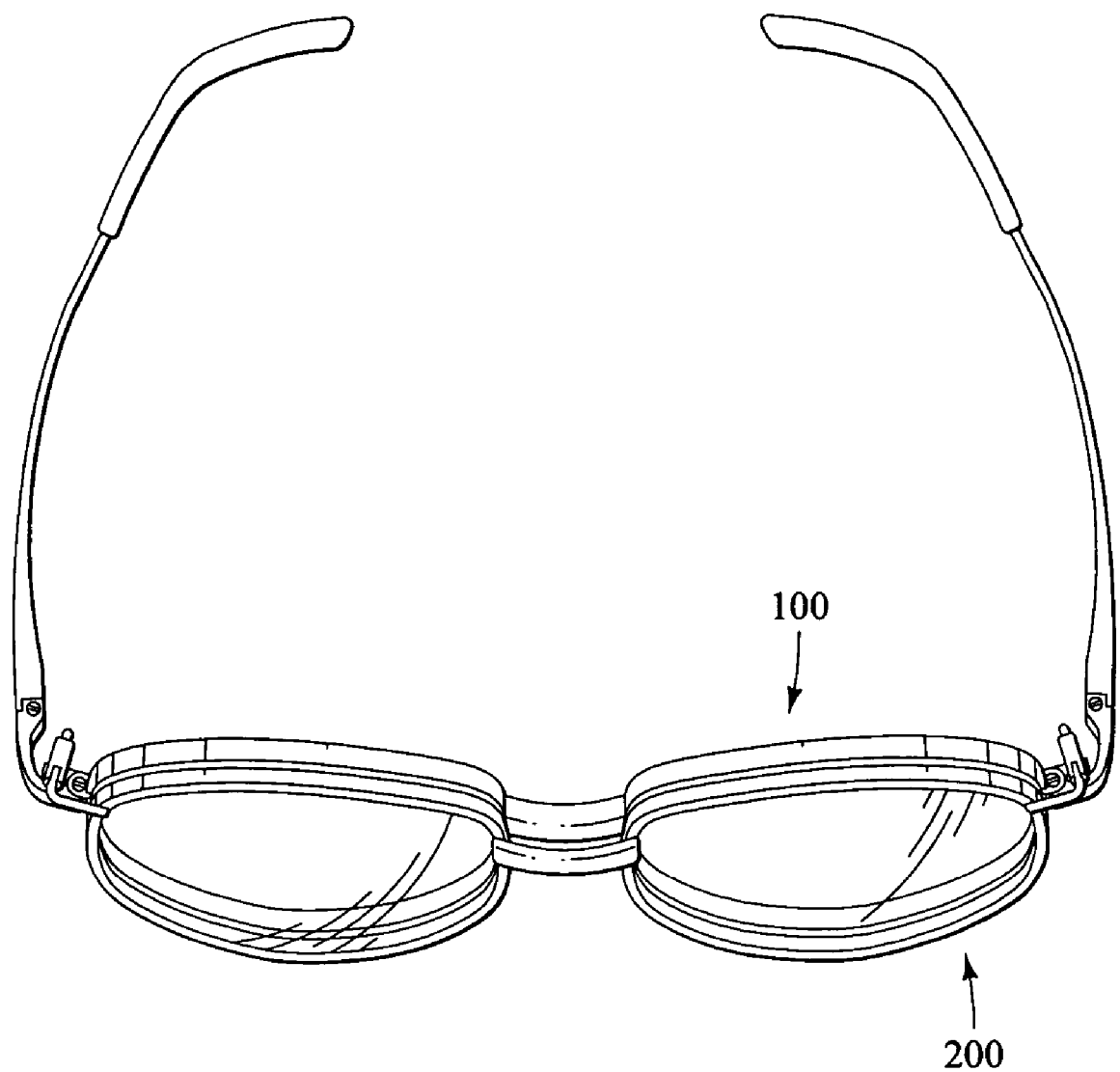
FIG. 1 is an isometric view of a preferred embodiment of the present invention, disclosing a primary lens assembly and an auxiliary lens assembly illustrating the assemblies attached, with the auxiliary lens assembly in the lower position.

FIG. 1 is an isometric view of a preferred embodiment of the present invention. In this view, a primary lens assembly 100 is illustrated with an auxiliary lens assembly 200 attached.

Figure 2:
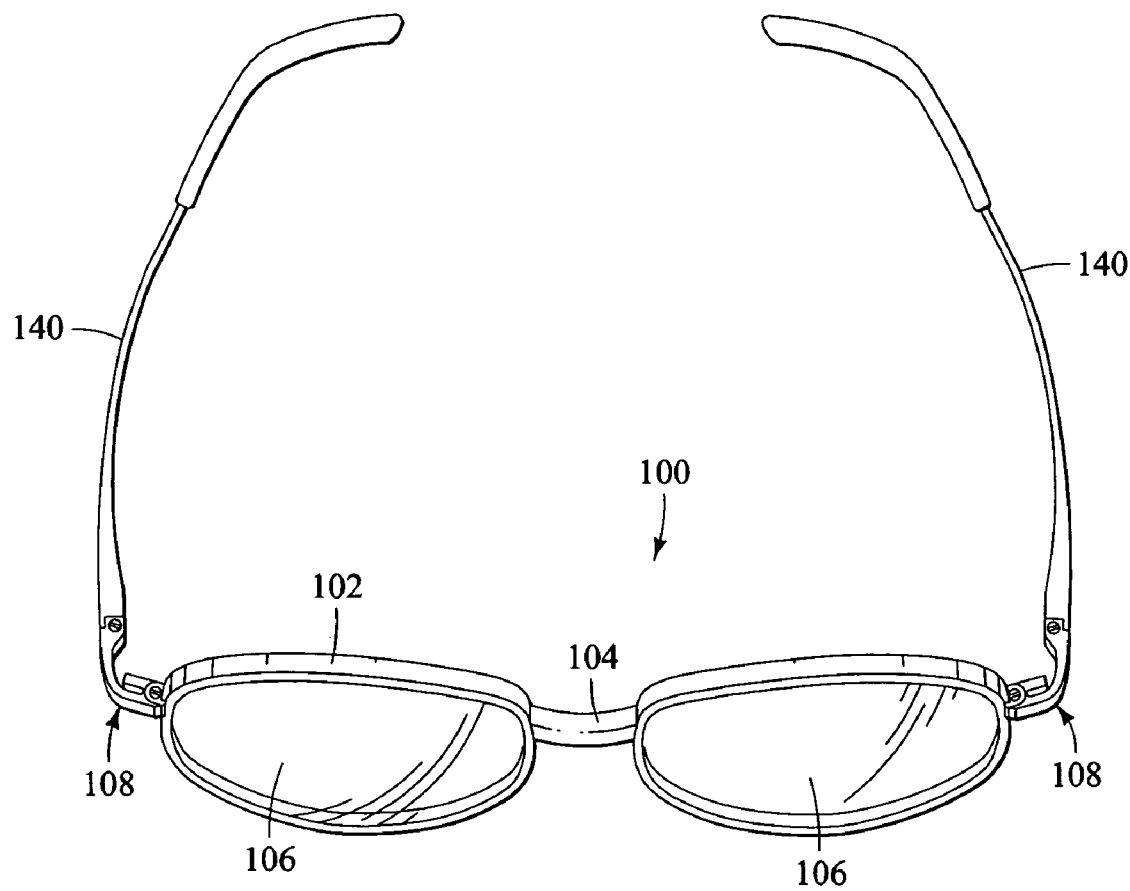
FIG. 2 is an isometric view of the preferred embodiment disclosed in FIG. 1, illustrating the primary lens assembly by itself.

FIG. 2 is an isometric view of a preferred embodiment of primary lens assembly 100. In the embodiment shown in this view, primary lens assembly 100 includes a primary frame 102. Primary frame 102 has a primary bridge 104. Primary frame 102 retains a pair of lenses 106. A pair of slotted extensions 108 extend outward, one from each side of primary frame 102.

Figure 3:
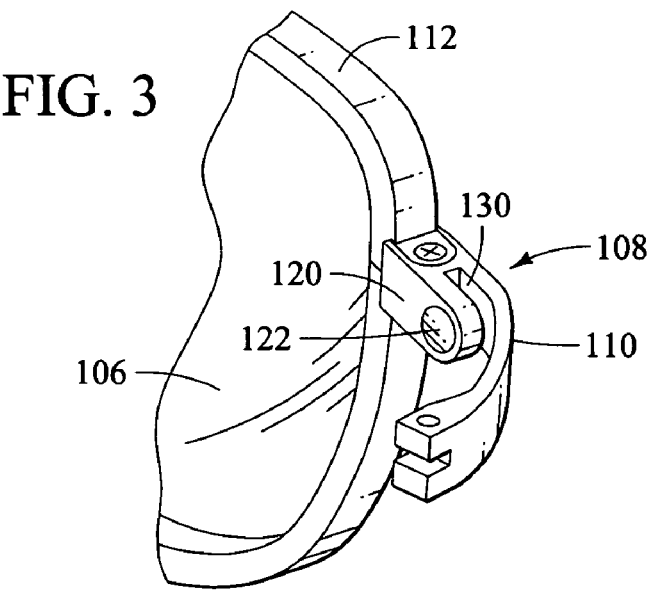
FIG. 3 is an isometric breakout view of the preferred embodiment of the primary lens assembly illustrated in FIGS. 1–2.

FIG. 3 is an isometric breakout view of the preferred embodiment of primary lens assembly 100. While this and other views illustrate the right side of primary lens assembly 100, the left side is similarly configured. In the embodiment shown in this view, slotted extension 108 has a front extension portion 110 and a rear extension portion 120. In a preferred embodiment, front extension 110 is partially co-joined to rear extension 120. In this manner of attachment, a slot 130 is formed between front extension 110 and rear extension 120. In the preferred embodiment shown, a primary magnet 122 is located within rear extension 120. In a still more preferred embodiment, front extension 110 is made of a magnetic material.

Primary magnets 122 may have a cylindrical geometry. If so, the flat surfaces (cylinder ends) of primary magnets 122 are preferably oriented in roughly parallel relationship to the surfaces of lenses 106. In a preferred embodiment, a leg 140 is pivotally attached to each front extension 110.

Figure 4:
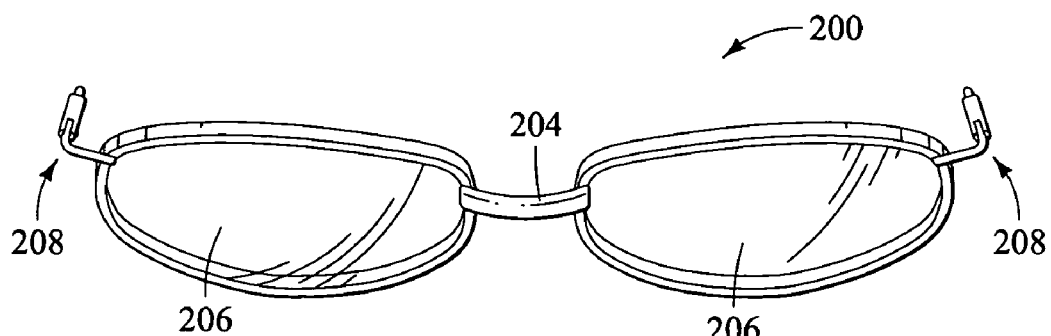
FIG. 4 is an isometric view of the preferred embodiment illustrated in FIG. 1, illustrating the auxiliary lens assembly by itself, in the lowered position.

FIG. 4 is an isometric view of the preferred embodiment disclosed in FIG. 1, illustrating the auxiliary lens assembly 200 by itself, in a lowered position. In the embodiment shown in this view, auxiliary lens assembly 200 includes an auxiliary frame 202. Auxiliary frame 202 has an auxiliary bridge 204. Auxiliary frame 202 retains a pair of lenses 206. Auxiliary frame 202 has a pair of auxiliary extensions 208 extending outward from the sides of auxiliary frame 202.

Figure 5:
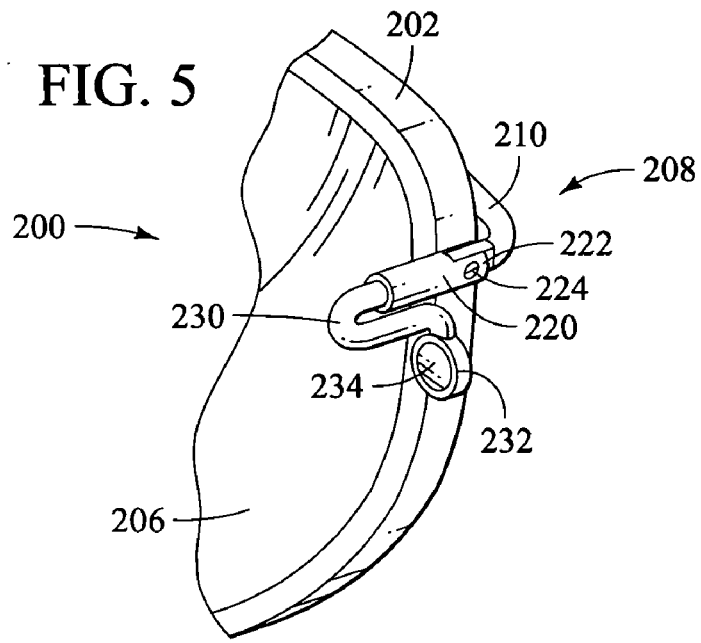
FIG. 5 is an isometric breakout view of the preferred embodiment of the auxiliary lens assembly illustrated in FIG. 1.
Figure 6:
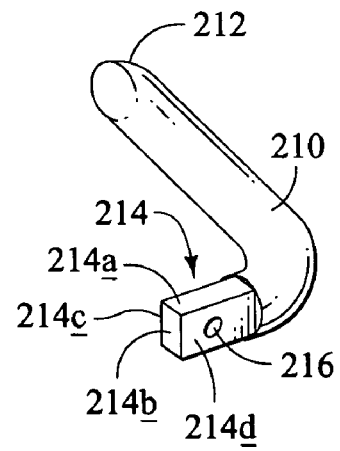
FIG. 6 is an isometric view of a bracket portion of the auxiliary lens assembly.

FIG. 5 is isometric breakout view of the embodiment of auxiliary lens assembly 200 shown in FIG. 4. As shown in this view, auxiliary extension 208 has a bracket 210. FIG. 6 is an isometric view of bracket 210 of auxiliary extension 208. As shown in this view, and as related to FIG. 5, bracket 210 has a first end portion 212 attached to auxiliary frame 202, and a keyseat 214 located on its opposite end. In a preferred embodiment, keyseat 214 is substantially rectilinear, having a top 214a and a flat end face 214b that is substantially perpendicular to top 214a. In the preferred embodiment, top 214a is substantially flat. Keyseat 214 also has pair of opposite flats 214c and 214d in substantially parallel relationship to each other. A hole 216 extends between flats 214c and 214d.

Referring to FIG. 5, auxiliary extension 208 has a hollow bodied rocker 220. Rocker 220 has a slotted end 222. Slotted end 222 is adapted to receive keyseat 214 of bracket 210. A pivot pin 224 extends through slotted end 222 and through hole 216 to pivotally attach rocker 220 to bracket 210. In a more preferred embodiment, pivot pin 224 is threadedly connected to slotted end 222.

Rocker 220 has an internal spring 226 (not shown) with a substantially flat end cap 228 (not shown). When auxiliary lens assembly 200 is in the lowered position, internal spring 226 compresses end cap 228 against end face 214b. When auxiliary lens assembly 200 is in the raised position, internal spring 226 compresses end cap 228 against top 214a of keyseat 214, between flats 214c and 214d.

Figure 7:
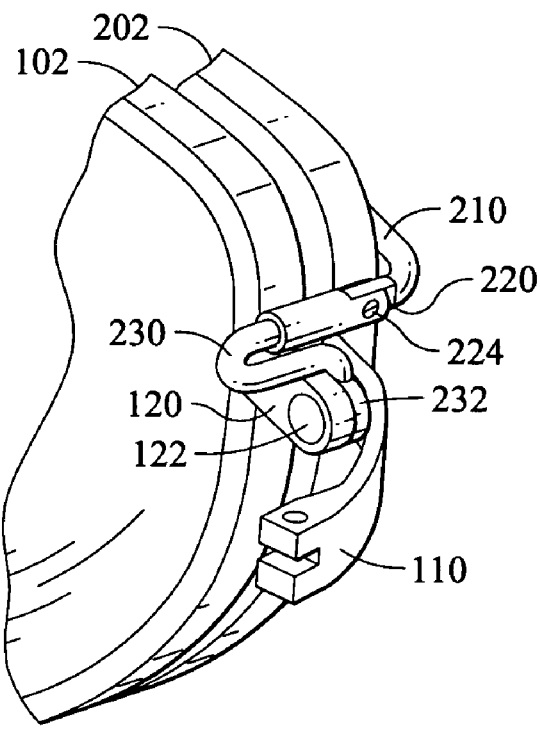
FIG. 7 is an isometric breakout view of the preferred embodiment illustrated in FIGS. 1–6, illustrating the assemblies attached, with the auxiliary lens assembly in the lowered position, and illustrating mechanical and magnetic engagement between the primary lens assembly and the auxiliary lens assembly.
Figure 8:
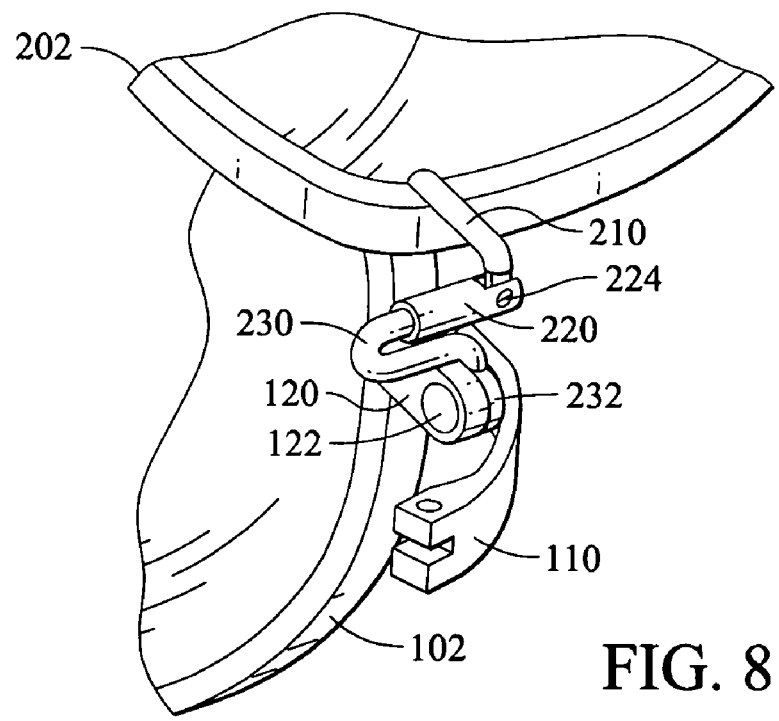
FIG. 8 is an isometric breakout view of the preferred embodiment illustrated in FIGS. 1–7, illustrating the assemblies attached, with the auxiliary lens assembly in the raised position.

FIG. 7 is an isometric breakout view of the preferred embodiment disclosed in FIG. 1–6, illustrating auxiliary lens assembly 200 attached to primary lens assembly 100, with auxiliary lens assembly 200 in the lowered position. FIG. 7 illustrates the mechanical and magnetic engagements between primary lens assembly 100 and auxiliary lens assembly 200. FIG. 8 is an isometric breakout view of the embodiment disclosed in FIG. 7, illustrating auxiliary lens assembly 200 attached to primary lens assembly 100, with auxiliary lens assembly 200 in the raised position.

Figure 9:
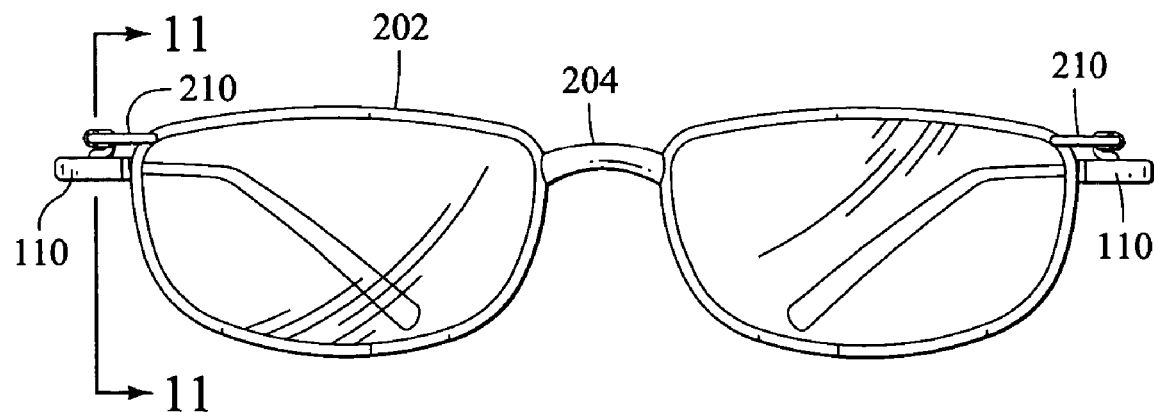
FIG. 9 is a front view of the preferred embodiment illustrated in FIGS. 1–8, illustrating the assemblies attached, with the auxiliary lens assembly in the lowered position.
Figure 10:
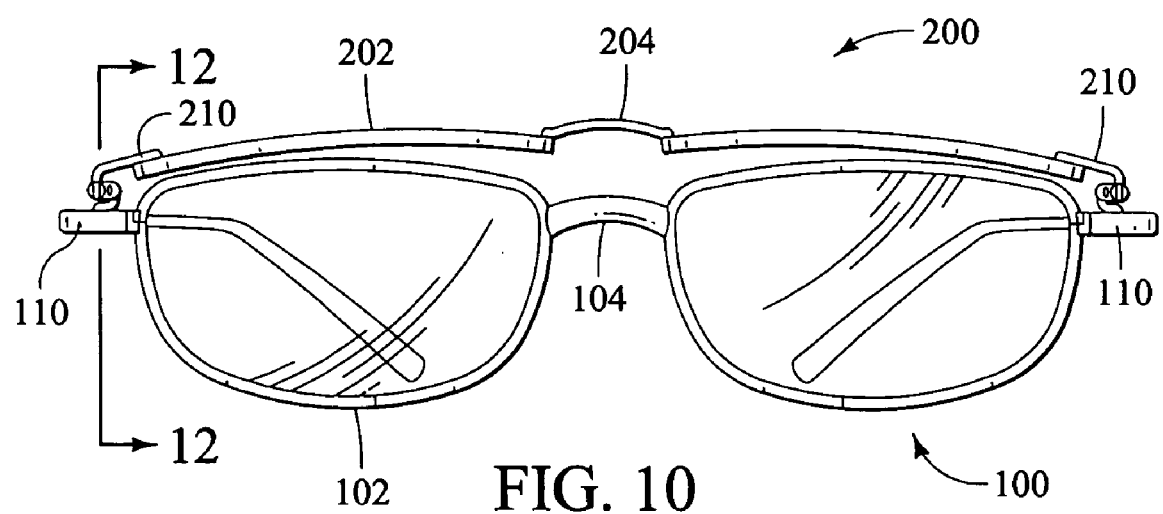
FIG. 10 is a front view of the preferred embodiment illustrated in FIGS. 1–9, illustrating the assemblies attached, with the auxiliary lens assembly in the raised position.
Figure 11:
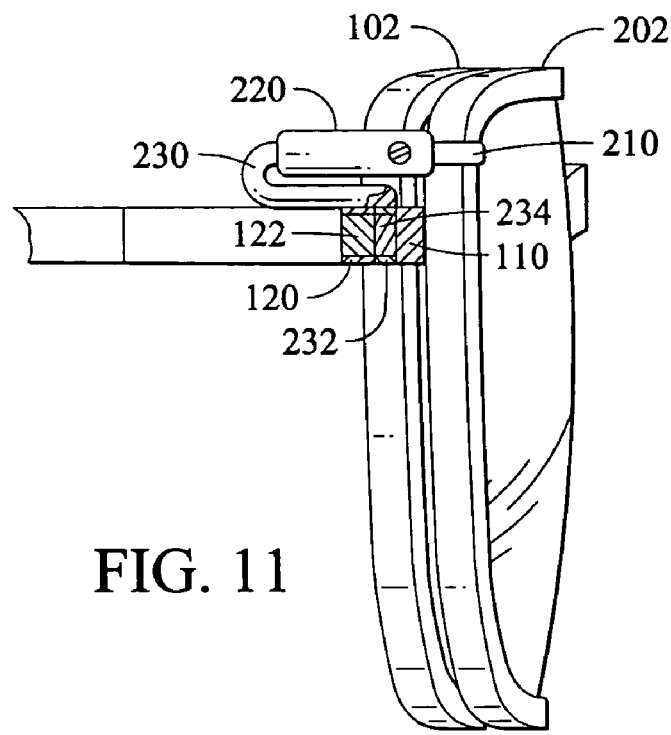
FIG. 11 is a side sectional view of the preferred embodiment illustrated in FIGS. 1–10, illustrating the assemblies attached, with the auxiliary lens assembly in the lowered position.
Figure 12:
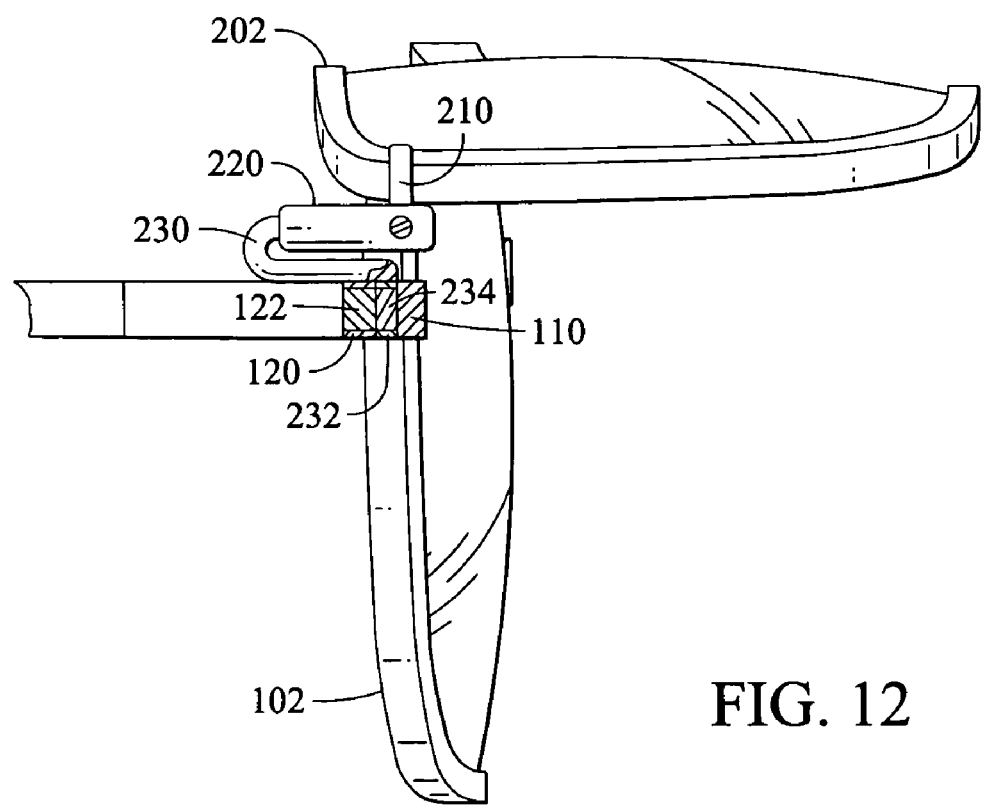
FIG. 12 is a side sectional view of the preferred embodiment illustrated in FIGS. 1–11, illustrating the assemblies attached, with the auxiliary lens assembly in the raised position.

FIG. 9 and FIG. 10 are front views of the preferred embodiment disclosed in FIGS. 1–8 showing auxiliary lens assembly 200 attached to primary lens assembly 100, with auxiliary lens assembly 200 in the lowered and raised positions respectively. FIG. 11 and FIG. 12 are side-sectional views of the preferred embodiment disclosed in FIGS. 1–10 showing auxiliary lens assembly 200 attached to primary lens assembly 100, with auxiliary lens assembly 200 in the lowered and raised positions respectively.

In the preferred embodiment, an arm 230 extends from rocker 220. A retainer 232 is located at the end of arm 230. In a preferred embodiment, arm 230 may be U-shaped, locating retainer 232 immediately beneath and below pivot pin 224. In the preferred embodiment, retainer 232 has a hollow center, and an auxiliary magnet 234 is located within retainer 232 of arm 230.

Auxiliary magnets 234 may have a cylindrical geometry. If so, the flat surfaces (cylinder ends) of auxiliary magnets 234 are oriented in approximate parallel relationship to the surfaces of primary lenses 106 when auxiliary lens assembly 200 is attached to primary lens assembly 100.

Figure 13:
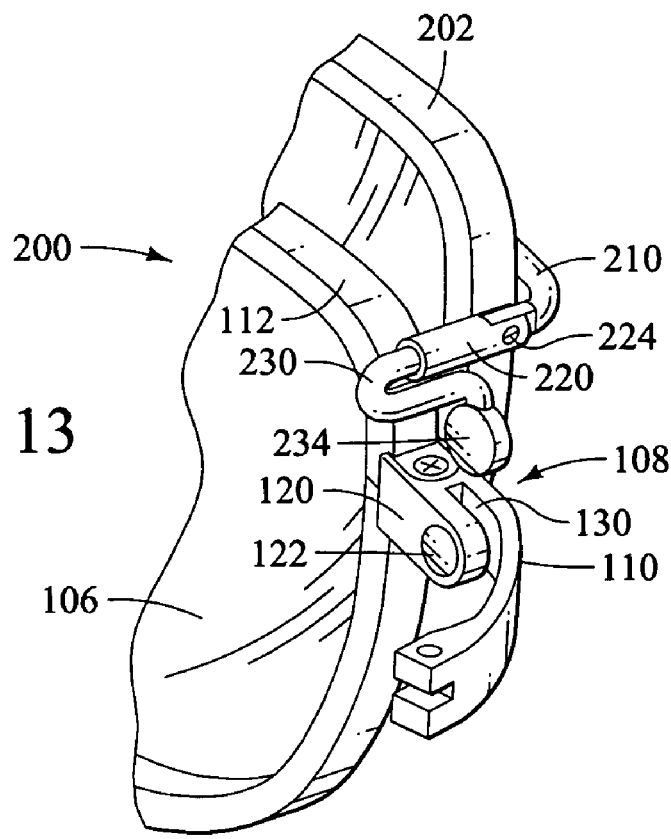
FIG. 13 is an isometric breakout view of a second embodiment, in which the retainer is made of a magnetic material, and no auxiliary magnet is required.

FIG. 13 discloses a second embodiment. In this embodiment, retainers 232 are solid (have no magnets), and are made of magnetic material. Retainers 232 may be formed integrally from the ends of brackets 210. Retainers 232 are subject to magnetic attraction from primary magnets 122.

Figure 14:
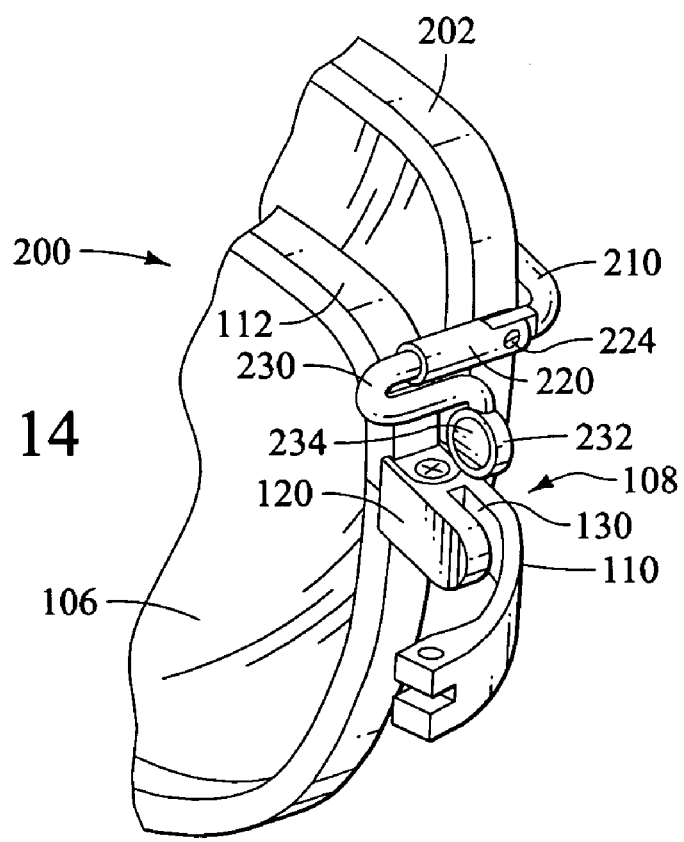
FIG. 14 is an isometric breakout view of a third embodiment, in which the rear extension portion is made of a magnetic material, and no primary magnet is required.

FIG. 14 discloses a third embodiment. In this embodiment, rear extension portions 120 are solid, (have no magnets) and are made of magnetic material. Rear extension portions 120 are subject to magnetic attraction from auxiliary magnets 232.

Figure 15:
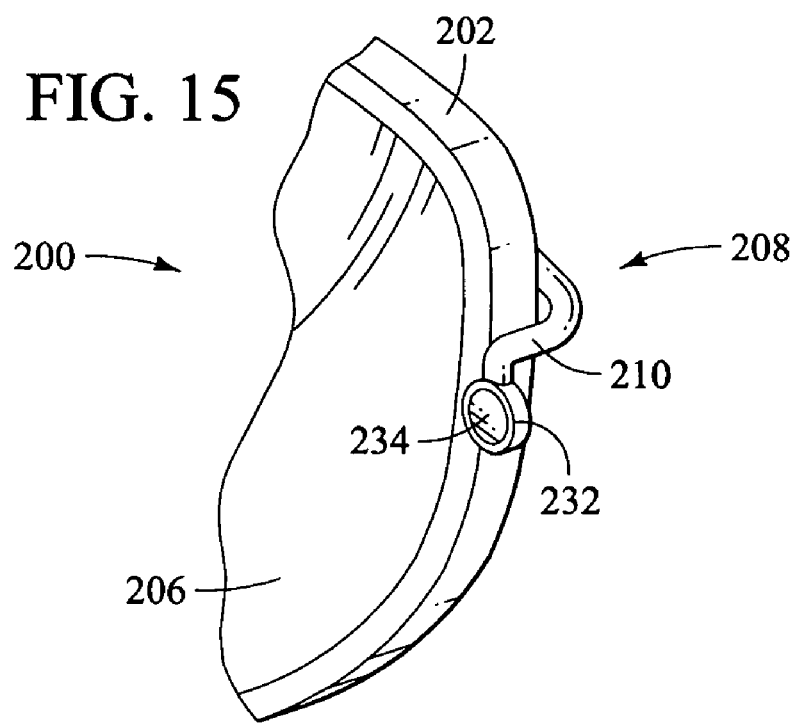
FIG. 15 is an isometric breakout view of a fourth embodiment of the auxiliary lens assembly, in which a non-rotatable auxiliary lens assembly is shown.
Figure 16:
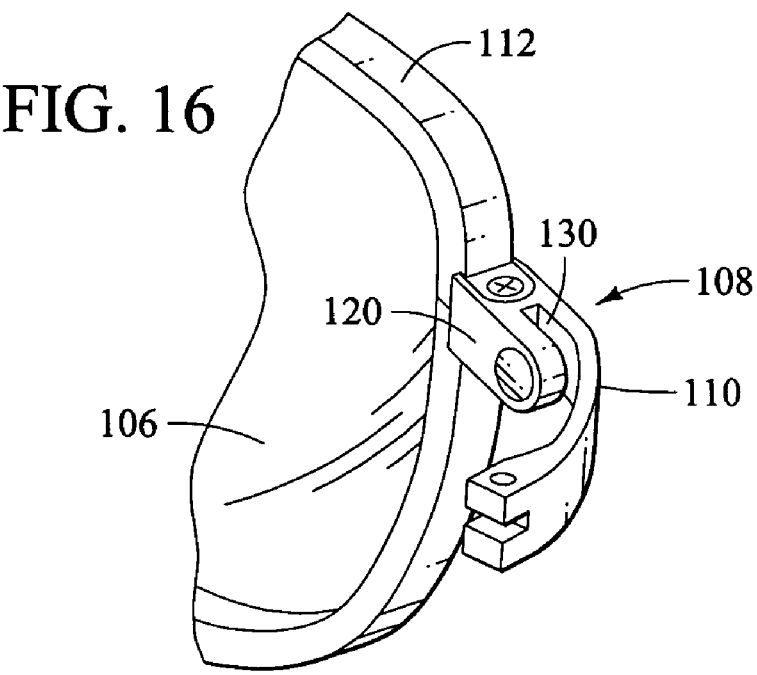
FIG. 16 is an isometric breakout view of the preferred embodiment of the primary lens assembly associated for use with the embodiment of the auxiliary lens assembly illustrated in FIG. 15, illustrating the same elements disclosed in FIG. 3.
Figure 17:
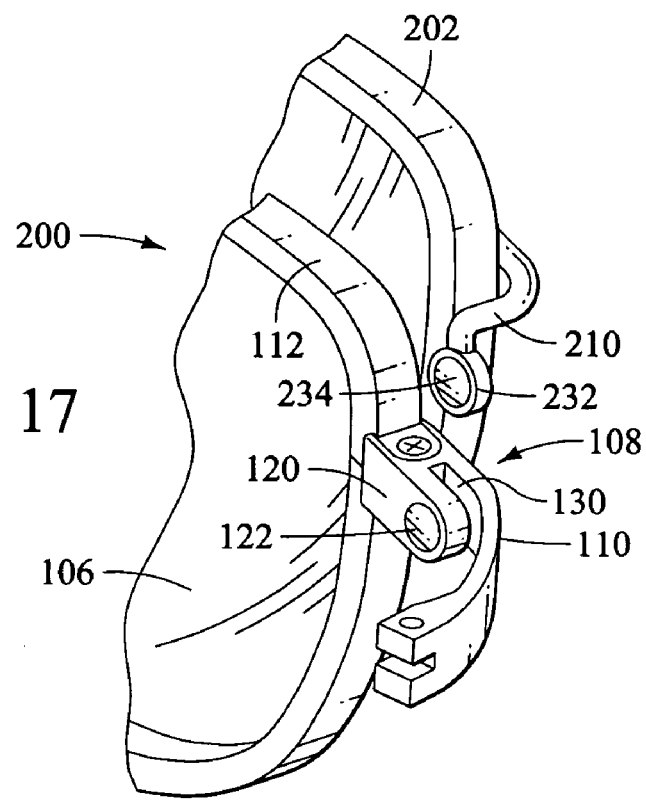
FIG. 17 is an isometric breakout view of the embodiment illustrated in FIGS. 15 and 16, illustrating the assemblies detached.
Figure 18:
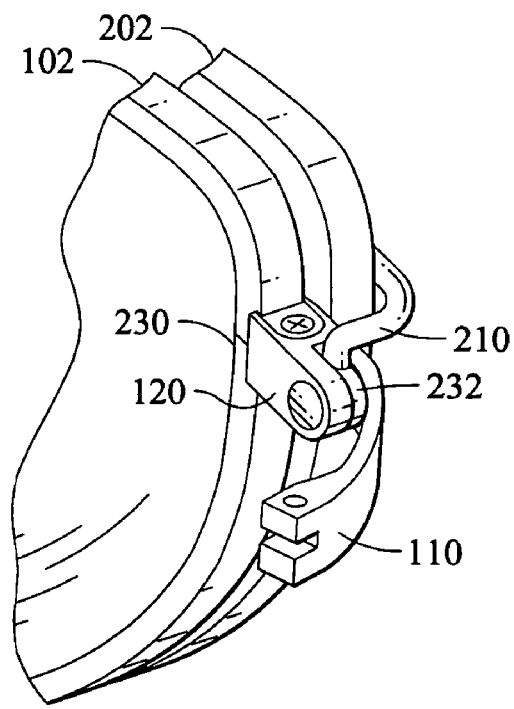
FIG. 18 is an isometric breakout view of the embodiment disclosed in FIGS. 15–17, illustrating the auxiliary assembly attached to the primary lens assembly. The mechanical and magnetic engagement between the primary lens assembly and the auxiliary lens assembly is illustrated.

FIG. 15 discloses a fourth embodiment of auxiliary lens assembly 200. In this somewhat simpler embodiment, auxiliary extensions 208 do not incorporate keyseat 214, rocker 220 or arm 230. Retainers 232 are attached to the ends of brackets 210. Auxiliary magnets 234 are contained in retainers 232. This configuration of auxiliary lens assembly 200 represents a known and readily available configuration. FIG. 16 discloses the complimentary primary lens assembly 100, which is the same as that of FIG. 3. FIG. 17 illustrates the auxiliary lens assembly 200 partially combined with primary lens assembly 100. FIG. 18 illustrates the full engagement of auxiliary lens assembly 200 with primary lens assembly 100. This combination demonstrates the compatibility of the primary lens assembly 100 of the present invention with existing, non-rotatable auxiliary lens assemblies 200.

Figure 19:
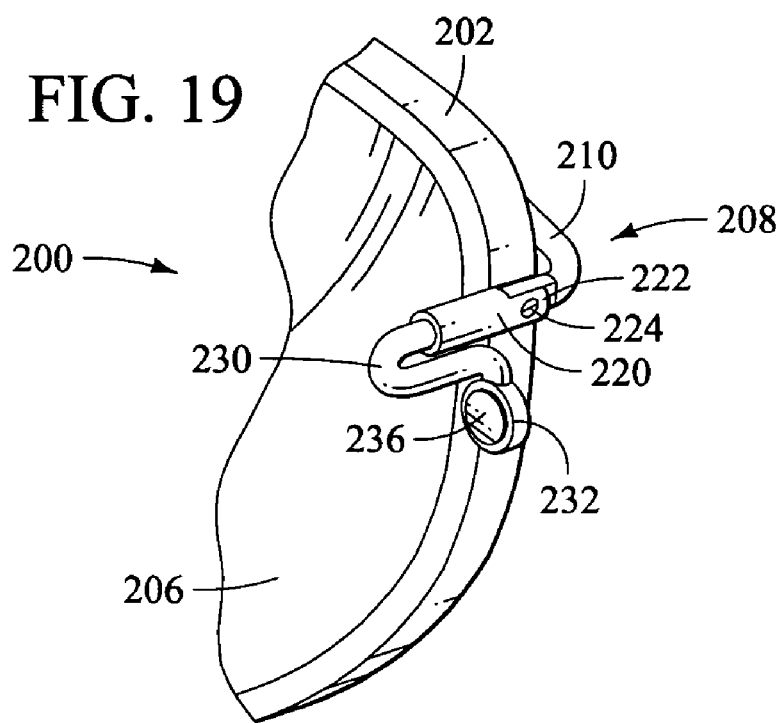
FIG. 19 is an isometric breakout view of a fifth embodiment, illustrating the auxiliary lens assembly having a compressible bushing located in place of the auxiliary magnet.
Figure 20:
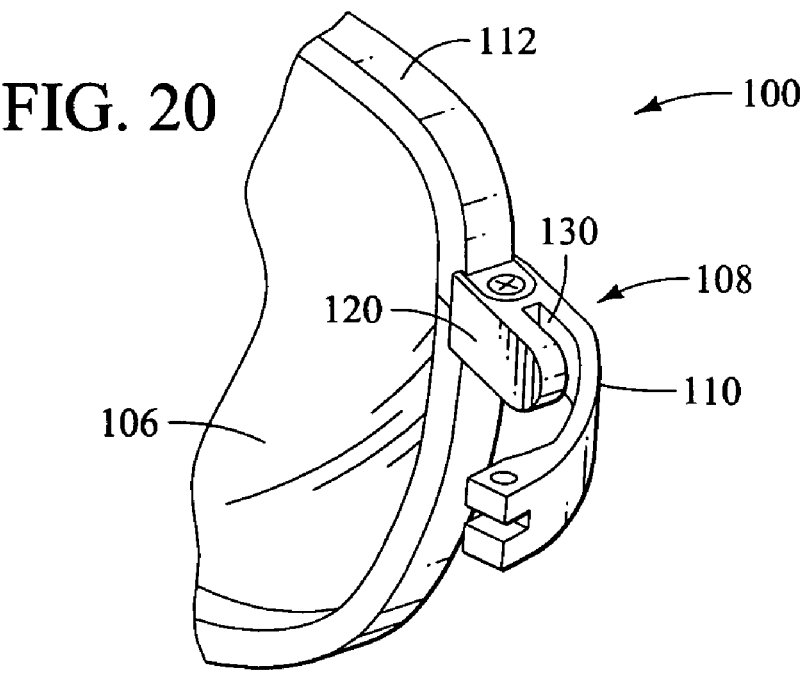
FIG. 20 is an isometric breakout view of the preferred embodiment of the primary lens assembly configured for connection to the embodiment of the auxiliary lens assembly disclosed in FIG. 19.

FIG. 19 discloses a fifth embodiment of auxiliary lens assembly 200. In this embodiment, retainers 232 have a hollow center. Compressible bushings 236 are located in retainers 232, in substitution for magnets 234. FIG. 20 illustrates the preferred embodiment of primary lens assembly 100 associated for use with the embodiment of the auxiliary lens assembly 200 illustrated in FIG. 19. Rear extension portion 120 is solid. No magnets are required. In this embodiment, the width of slot 130 is less than the thickness of bushing 236, to permit a secure interference fit. This embodiment of primary lens assembly 100 is also compatible with existing, non-rotatable rotatable auxiliary lens assemblies 200, when front extension portions 110 and/or rear extension portions 120 are made of magnetic material.

Figure 21:
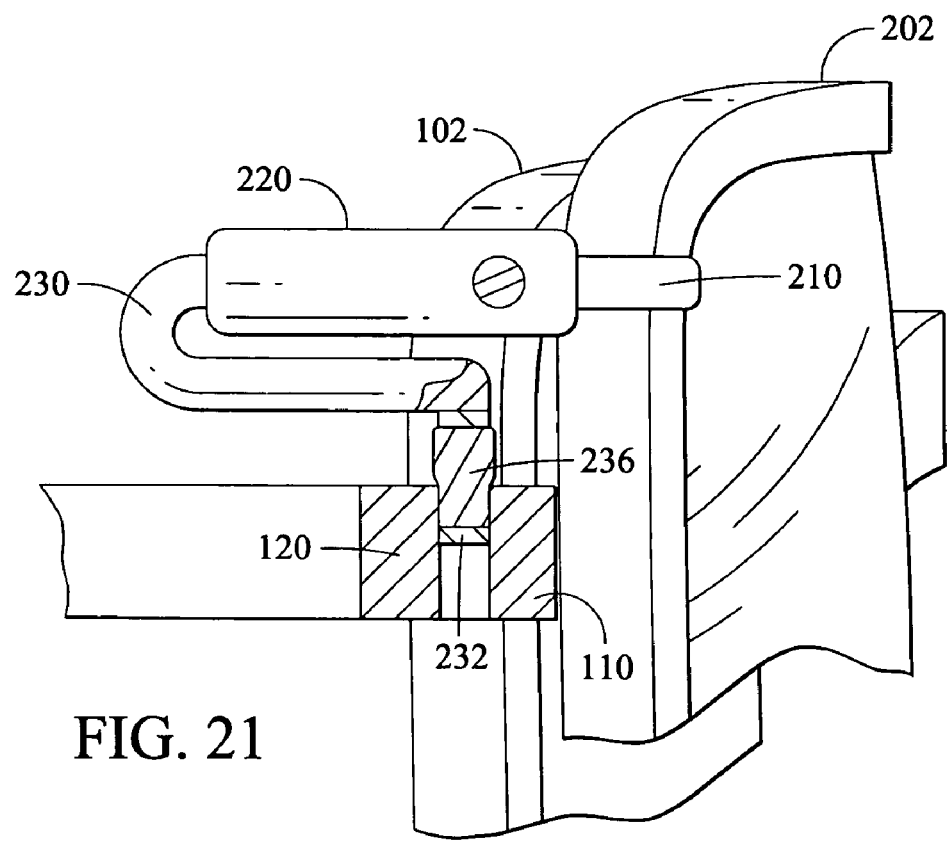
FIG. 21 is a side sectional view of the preferred embodiment illustrated in FIGS. 19–20, illustrating the primary and auxiliary lens assemblies partially attached, illustrating the compression of the auxiliary bushing engaging the slot of the primary extension.
Figure 22:
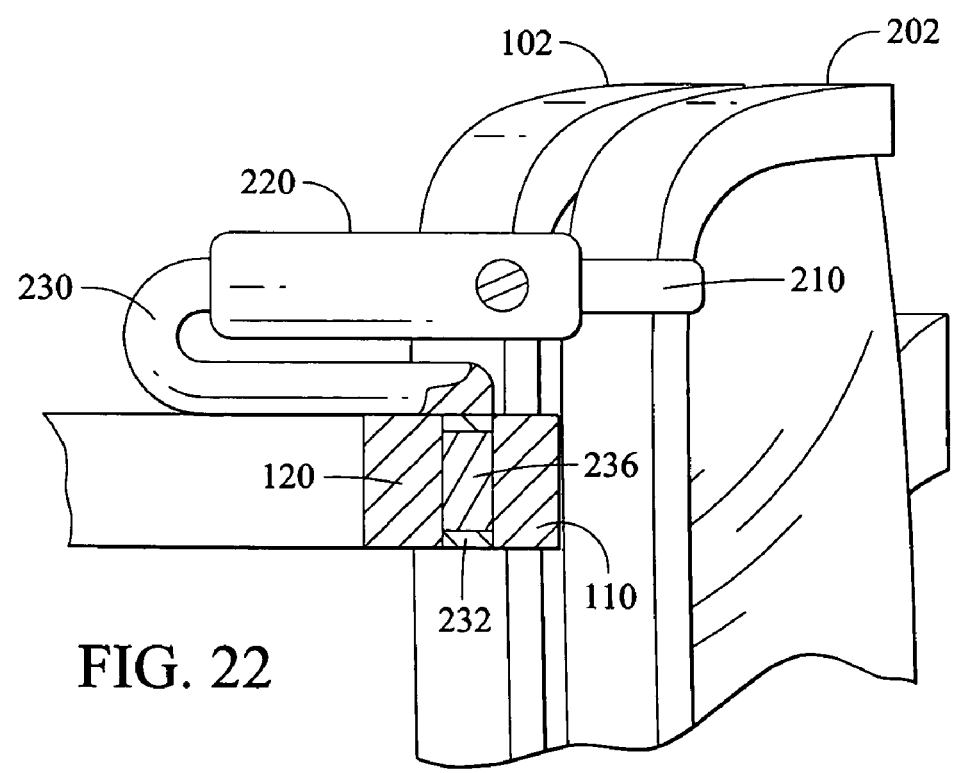
FIG. 22 is a side sectional view of the preferred embodiment illustrated in FIG. 21, illustrating the primary and auxiliary lens assemblies attached, with the auxiliary lens assembly in the lowered position.

FIG. 21 and FIG. 22 are side-sectional views of the embodiment disclosed in FIGS. 19–20. FIG. 21 shows auxiliary lens assembly 200 partially attached to primary lens assembly 100, with auxiliary lens assembly 200 in the lowered position, and illustrating the compressibility of bushing 234. FIG. 22 shows showing auxiliary lens assembly 200 attached to primary lens assembly 100, with auxiliary lens assembly 200 in the lowered position.

Figure 23:
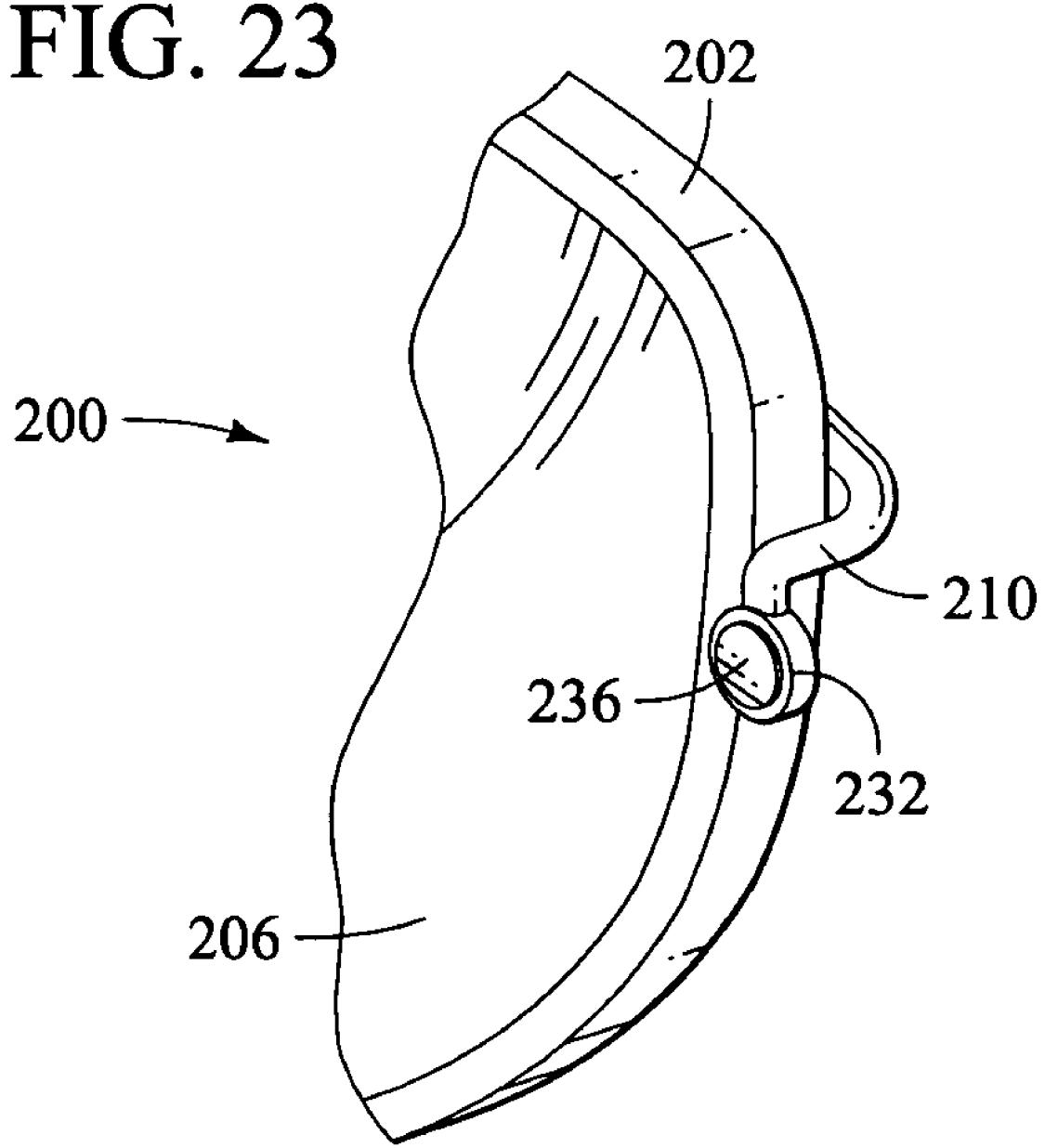
FIG. 23 is an isometric breakout view of a sixth embodiment that combines elements disclosed in the fourth and fifth embodiments and illustrated in FIGS. 15–22.
Figure 24:
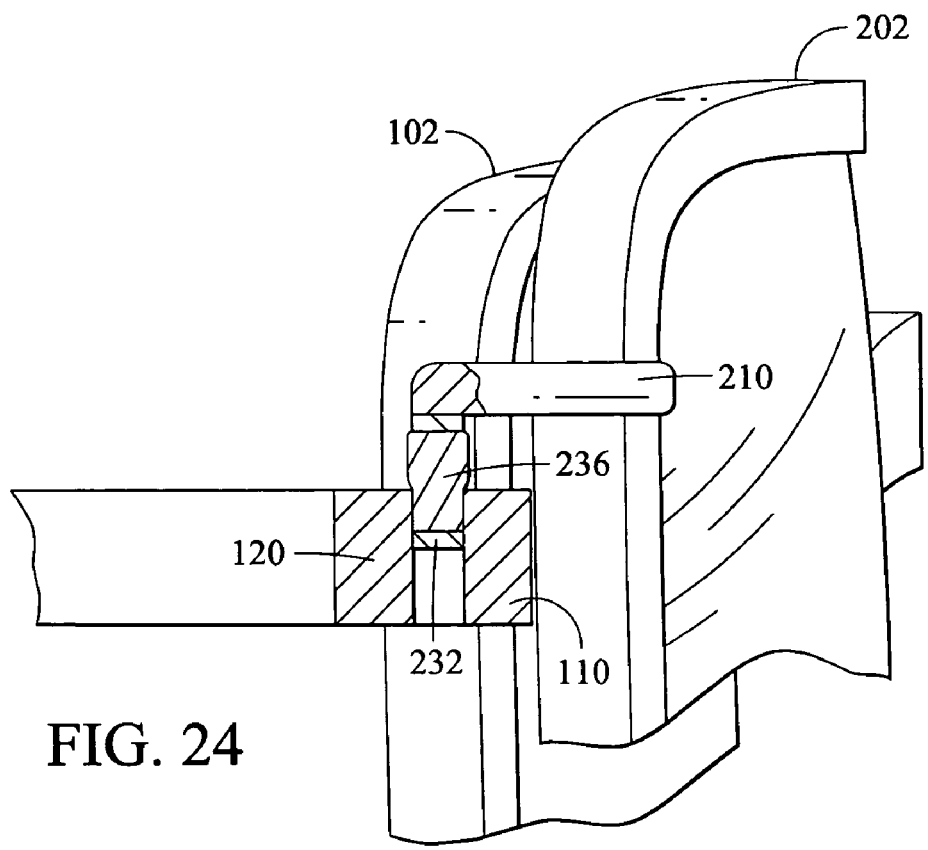
FIG. 24 is a side sectional view of the embodiment illustrated in FIG. 23, illustrating the primary and auxiliary lens assemblies partially attached, with the auxiliary lens assembly in the lowered position.
Figure 25:
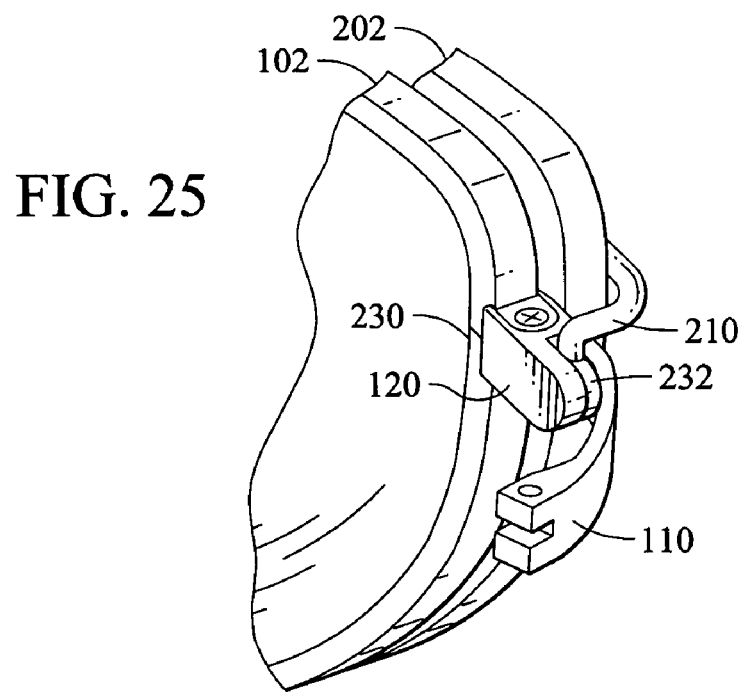
FIG. 25 is an isometric breakout view of the embodiment illustrated in FIGS. 23–24, illustrating the primary and auxiliary lens assemblies attached, with the auxiliary lens assembly in the lowered position.

FIG. 23 discloses a sixth embodiment of auxiliary lens assembly 200. In this embodiment, auxiliary extensions 208 do not incorporate keyseat 214, rocker 220 or arm 230. Retainers 232 are attached to the ends of brackets 210. Compressible bushings 236 are contained in retainers 232. FIG. 24 discloses the preferred embodiment of the complimentary primary lens assembly 100, which is the same as that of FIG. 20. FIG. 24 illustrates the auxiliary lens assembly 200 partially combined with primary lens assembly 100. FIG. 25 illustrates the full engagement of auxiliary lens assembly 200 with primary lens assembly 100. This combination demonstrates the compatibility of the primary lens assembly 100 of the present invention with alternative, non-rotatable auxiliary lens assemblies 200.

In a seventh preferred embodiment, one or both of primary lenses 106 are corrective lenses and auxiliary lenses 206 and are impact resistant and/or radiation resistant (i.e. welding lenses) or safety lenses.

The preferred embodiments of primary frame 102 and auxiliary frame 202 illustrated surround the entire perimeter of primary lenses 106 and auxiliary lenses 206 respectively. Alternatively, primary frame 102 may only partially surround the perimeter of primary lenses 106. Likewise, auxiliary frame 202 may only partially surround the entire perimeter of auxiliary lenses 206. Such configurations are known in the industry as "open edge."

In another preferred embodiment, primary lenses 106 are attached directly to primary bridge 104. In this embodiment, slotted extensions 108 are attached directly to primary lenses 106. In another preferred embodiment, auxiliary lenses 206 are attached directly to auxiliary bridge 204. In this embodiment, auxiliary extensions 208 are attached directly to auxiliary lenses 206. Such configurations are known in the industry as "frameless."

The various embodiments disclosed herein which include magnetic attraction will be appreciated by one of ordinary skill in the art to involve a combination of magnet-to-magnet magnetic engagement, or magnet-to-magnetic material magnetic engagement. "Magnetic material" as used herein is defined as materials subject to attraction by magnetic force, thus being magnetically attractable.

OPERATION OF THE PREFERRED EMBODIMENT

The preferred embodiment is disclosed in FIGS. 1–12. In this embodiment, primary magnets 122 magnetically and physically engage auxiliary magnets 234 located in retainers 232. The magnetic engagement provides sufficient force to secure and position auxiliary lens assembly 200 in connection with primary lens assembly 100. In the preferred embodiment, front extension portions 110 are also made of magnetic material, providing additional magnetic attraction between auxiliary magnets 234 and front extension portions 110. The magnetic force between the magnets and magnetic materials, however arranged between the slotted extensions 108 and retainers 232, prevents unintentional vertical displacement of auxiliary lens assembly 200 from primary lens assembly 100.

Once attached to primary lens assembly 100, auxiliary lens assembly 200 is rotatable to two alternative positions. In a first "lowered" position, auxiliary lenses 206 are substantially aligned with primary lenses 106. This causes light to pass through both auxiliary lenses 206 and primary lenses 106 before reaching the eyes of the person wearing the device. In a second "raised" position, auxiliary lenses 206 are removed from alignment with primary lenses 106. This causes light to pass only through primary lenses 106 before reaching the eyes of the person wearing the device.

In FIG. 1, auxiliary lens assembly 200 is illustrated in the lowered position. In a preferred embodiment, primary lenses 106 are corrective lenses and auxiliary lenses 206 are light transmission reducing lenses, such as a polarizing, absorbing, refracting, photochromatic, or reflecting lens, or any combination thereof (e.g., sunglasses). If the wearer needs to see only through primary lens assembly 100, he/she may optionally remove auxiliary lens assembly 200, or rotate it to the raised position. A preference to rotate auxiliary lens assembly 200 to the raised position may occur, for example, when the eyeglass wearer drives his/her automobile from a brightly sunlit environment into a tunnel or parking garage, or needs to read a newspaper or mobile telephone display while outside. In these instances, the eyeglass wearer may not wish to manually disengage and store auxiliary lens assembly 200 at that moment, and flipping auxiliary lens assembly 200 up into the raised position is safer, and/or more convenient.

As seen in FIGS. 9 and 10, in the raised position, auxiliary lens assembly 200 is positioned directly above primary lens assembly 100. In the raised position, auxiliary lenses 206 are removed from alignment with primary lenses 106. This causes light to pass only through primary lenses 106 before reaching the eyes of the person wearing the device, without the need to remove and store auxiliary lens assembly 200. This is most useful when the need to have light pass only through primary lenses 106 is temporary.

Referring to FIGS. 6 and 7, when auxiliary lens assembly 200 is in the lowered position, internal springs 226 (not shown) inside rockers 220 compress end caps 228 against end faces 214b of keyseats 214, providing a spring force for retaining auxiliary lens assembly 200 in the lowered position. When auxiliary lens assembly 200 is moved into the raised position, internal springs 226 compress end caps 228 against tops 214a of keyseats 214, providing a spring force for retaining auxiliary lens assembly 200 in the raised position. In the preferred embodiment, the raised and lowered positions of auxiliary lens assembly 200 are 90° apart as determined by the angle between top 214a and end flat 214b. It is possible to define raised and lowered positions that are other than 90° apart by altering the angle between tops 214a and end flats 214b, or by providing an additional faceted surfaces on keyseats 214 against which end caps 228 may be compressed.

Compression of internal springs 226 against tops 214a and end flats 214b discourages location of auxiliary lens assembly 200 in any intermediate angular position with respect to primary lens assembly 100. Auxiliary lens assembly 200 is held securely in the raised and the lowered positions by the compressive force of internal springs 226, against the flat surfaces. This urges auxiliary lens assembly 200 into the desired angular positions; snapping it into place in the lowered position, and in the raised position. It also serves to discourage mis-positioning due to movement other than intention rotation, such as running and jumping activities.

As seen in FIG. 17, 21, and 24, in the various embodiments disclosed, auxiliary lens assembly 200 may be attached to primary lens assembly 100 by lowering auxiliary lens assembly 200 onto primary lens assembly 100 such that retainers 232 slide into slots 130 respectively. This requires only alignment and downward movement. The various embodiments disclose, in part, various arrangements for generating magnetic force between slotted extensions 108 and retainers 232. The magnetic force between the magnets and magnetic materials, however arranged, prevent unintentional vertical displacement of auxiliary lens assembly 200 from primary lens assembly 100.

As seen in FIG. 3, slotted extensions 108 have and a front extension portion 110 and a rear extension portion 120. The space between front extension portion and rear extension portion 120 forms a slot 130 for accommodation of retainer 232. When rotating auxiliary lens assembly 200 into the raised position, the force provided by compressed internal springs 226 against end caps 228 will urge retainers 232 to rotate with auxiliary frame 202 and auxiliary lens 206. Front extension portions 110 and rear extension portions 120 transmit this rotational force to primary lens assembly 100. The force required to compress internal springs 226 sufficiently to allow rotation of keyseats 214 within rocker 220 is less than the force required to cause disruptive movement of the entire primary lens assembly 100 attached to the face of the wearer. As a result, auxiliary lens assembly 200 is easily rotated into the raised or lowered positions, and conveniently snaps into position.

In a second embodiment, illustrated in FIG. 13, retainers 232 are solid (have no magnets), and are made of magnetic material. Retainers 232 may be formed integrally from the ends of brackets 210. In this embodiment, magnetic force secures primary magnets 122 to retainers 232 and prevents unintentional vertical displacement of auxiliary lens assembly 200 from primary lens assembly 100.

In a third embodiment, (illustrated in FIG. 14, rear extension portions 120 are solid (have no magnets), and are made of magnetic material. In this embodiment, magnetic force secures auxiliary magnets 122 to rear extension portions 120 and/or front extension portions 110 (which may also be made of magnetic material) and prevents unintentional vertical displacement of auxiliary lens assembly 200 from primary lens assembly 100.

In a fourth embodiment, illustrated in FIGS. 15–18, retainers 232 are directly connected to the ends of brackets 210. This embodiment of auxiliary lens assembly 200 is generally known in the industry. In this embodiment, auxiliary lens assembly 200 is not rotatable relative to primary lens assembly 100. This embodiment demonstrates the adaptability of the primary lens assembly 100 of the present invention for use with auxiliary lens assemblies 200 that are rotatable, and with those that are not.

In a fifth embodiment, illustrated in FIGS. 19 and 20, no magnets are required in either the primary lens assembly 100 or auxiliary lens assembly 200, and retainers 232 and slotted extensions need not be made of magnetic material. Retainers 232 have a hollow center. Compressible bushings 236 are located in retainers 232, in substitution for magnets 234. As shown in FIGS. 21 and 22, compressible bushings 236 are positionable in slots 130 in an interference fit. In this embodiment, interference between compressible bushings 236 and slots 130 prevents unintentional vertical displacement of auxiliary lens assembly 200 from primary lens assembly 100, and permits rotation of auxiliary lens assembly 200 between the raised and lowered positions relative to the primary lens assembly 100.

In a sixth preferred embodiment, illustrated in FIG. 23 no magnets are required in either the primary lens assembly 100 or auxiliary lens assembly 200, and retainers 232 and slotted extensions 130 need not be made of magnetic material. Retainers 232 are directly connected to the ends of brackets 210. Retainers 232 have a hollow center. Compressible bushings 236 are located in retainers 232, in substitution for auxiliary magnets 234. As shown in FIGS. 24 and 25, compressible bushings 236 are positionable in slots 130 in an interference fit. In this embodiment, interference between compressible bushings 236 and slots 130 prevents unintentional vertical displacement of auxiliary lens assembly 200 from primary lens assembly 100. This embodiment combines elements disclosed in the fourth and fifth embodiments detailed above.

In a seventh preferred embodiment, one or both of primary lenses 106 are corrective lenses and auxiliary lenses 206 and are impact resistant and/or radiation resistant (i.e., welding lenses) safety lenses. This configuration permits the eyeglass wearer the convenience of utilizing generic safety lenses fitted to his or her prescription. Auxiliary lens assembly 200 and safety lenses 206 can be flipped up and out of the way when close visual inspection is required without the need for protection. By not having to remove a separate pair of safety glasses, they are not easily misplaced. Also, if safety lenses 206 are damaged, they can be replaced without having to replace the more expensive prescription lenses.

It will be obvious to one of ordinary skill in the art that certain features disclosed in the above detailed embodiments are readily combinable with the features of the other embodiments disclosed herein, as shown for the purpose of example, and not by limitation, in the sixth preferred embodiment detailed above. It will also be readily apparent to those skilled in the art, and the general principles defined herein may be applied to other embodiments and applications without departing from the spirit and scope of the present invention.

We claim:

1. An eyewear system comprising:
   a primary lens assembly having:
      a primary frame for retaining a pair of primary lenses; and,
      a pair of slotted extensions attached to the primary frame;
   an auxiliary lens assembly including:
      an auxiliary frame for retaining a pair of auxiliary lenses; and,
      a pair auxiliary extensions attached to the auxiliary frame, each auxiliary extension having:
         a bracket attached to the auxiliary frame;
         a rocker pivotally attached to the bracket;
         an arm extending from the rocker;
         a retainer attached to the arm;
         compressible bushing located in the retainer; and,
         whereas the retainer is locatable within the slotted extension.

2. The eyewear system of claim 1, the slotted extension further comprising:
   a front extension portion;
   a rear extension portion partially conjoined to the front extension; and
   a slot formed between the non-joined portions of the front extension portion and the rear extension portion.

3. The eyewear system of claim 1, further comprising:
   a leg portion attached to each slotted extension.

4. The eyewear system of claim 1, further comprising:
   the bracket attached to the auxiliary lens frame on one end, and having a keyseat on its opposite end;
   the keyseat having a top, and a substantially flat end face;
   the rocker having an internal spring with a substantially flat end cap;
   whereas the end cap engages the top of the keyseat when the auxiliary lens assembly is in the raised position; and,
   whereas the end cap engages the end face when the auxiliary lens assembly is in the lowered position.

5. The eye wear system of claim 4, further comprising:
   the top of the keyseat is substantially perpendicular to the end face.

6. The eyewear system of claim 1, further comprising:
   the primary lenses are corrective lenses; and,
   the auxiliary lenses are safety lenses.

7. An eye wear system comprising:
   a primary lens assembly having:
      a primary frame for retaining a pair of primary lenses;
      a pair of slotted extensions attached to the primary frame; and,
   an auxiliary lens assembly including:
      an auxiliary frame for retaining a pair of auxiliary lenses; and,
      a pair auxiliary extensions attached to the auxiliary frame, each auxiliary extension having:
         a bracket attached to the auxiliary frame;
         a rocker pivotally attached to the bracket;
         an arm extending from the rocker;
         a compressible retainer attached to the arm; and,
         whereas the retainer is locatable within the slotted extension.

8. An eye wear system comprising:
   a primary lens assembly having:
      a primary frame for retaining a pair of primary lenses;
      a pair of slotted extensions attached to the primary frame; and, an auxiliary lens assembly including:
  an auxiliary frame for retaining a pair of auxiliary lenses; and,
  a pair auxiliary extensions attached to the auxiliary frame, each auxiliary extension having:
    a bracket attached to the auxiliary frame;
    a rocker pivotally attached to the bracket;
    an arm extending from the rocker;
    a retainer attached to the arm;
    a compressible bushing located in the retainer; and,
  whereas the retainer and bushing are locatable within the slotted extension.

* * * * *